US012703103B2

(12) United States Patent
Albrecht et al.

(10) Patent No.: US 12,703,103 B2
(45) Date of Patent: Aug. 11, 2026

(54) SYSTEM AND METHOD FOR CONTROLLING OPERATION OF A ROBOT

(71) Applicant: THE BOEING COMPANY, Arlington, VA (US)

(72) Inventors: Mark Everette Albrecht, Lake Stevens, WA (US); Kwok-Tung Chan, Mercer Island, WA (US)

(73) Assignee: The Boeing Company, Arlington, VA (US)

( * ) Notice: Subject to any disclaimer, the term of this patent is extended or adjusted under 35 U.S.C. 154(b) by 48 days.

(21) Appl. No.: 18/651,775

(22) Filed: May 1, 2024

(65) Prior Publication Data

US 2025/0339970 A1 Nov. 6, 2025

(51) Int. Cl.
*B25J 9/16* (2006.01)
*B25J 13/08* (2006.01)

(52) U.S. Cl.
CPC ........... *B25J 9/1694* (2013.01); *B25J 9/1676* (2013.01); *B25J 13/088* (2013.01)

(58) Field of Classification Search
CPC ....... B25J 9/1694; B25J 9/1676; B25J 13/088
See application file for complete search history.

(56) References Cited

U.S. PATENT DOCUMENTS

2018/0239010 A1* 8/2018 Mindell .................. G01S 13/34
2021/0053225 A1* 2/2021 Kriveshko ............. B25J 13/088
2021/0181708 A1* 6/2021 Chan ................... G08B 21/185
2021/0239794 A1 8/2021 Fauth

FOREIGN PATENT DOCUMENTS

DE 20 2020 100454 4/2021

OTHER PUBLICATIONS

ISO/TS 15066:2016 (2016), International Organization for Standardization [ISO] (Year: 2016).*
Extended European Search Report for EP App. No. 25160559.8-1206, dated Aug. 20, 2025.

* cited by examiner

*Primary Examiner* — Adam R Mott
*Assistant Examiner* — Matthew C Gammon
(74) *Attorney, Agent, or Firm* — Joseph M. Butscher; Carroll, Hoette & Butscher, LLC

(57) ABSTRACT

A system and a method include a robot. A radar transmitter is configured to output a radar signal. A harmonic receiver is configured to receive a harmonic signal. A harmonic reflector is configured to be coupled to an object. The harmonic reflector is configured to output the harmonic signal in response to the radar signal contacting the harmonic reflector. A control unit is in communication with the robot, the radar transmitter, and the harmonic receiver. The control unit is configured to determine a position, a speed, and a direction of the harmonic reflector based on the harmonic signal, and regulate operation of the robot based on the position, the speed, and direction of the harmonic reflector.

20 Claims, 5 Drawing Sheets

SYSTEM AND METHOD FOR CONTROLLING OPERATION OF A ROBOT

FIELD OF THE DISCLOSURE

Examples of the present disclosure generally relate to systems and methods for controlling operation of a robot, and more particularly to systems and methods for safely operating a robot based on tracked harmonic signals.

BACKGROUND OF THE DISCLOSURE

Various structures are formed and assembled by robots. Further, human operators often cooperate with robots in certain manufacturing settings. In particular, a cobot (that is, a collaborative robot) interacts with one or more humans in a workspace to form a structure. The cobot and human operator each perform certain defined tasks on the structure during a manufacturing process.

In a robotic work environment, significant steps are taken to safeguard humans from injury. Such steps include fencing, locked gates, laser curtains, weight detecting mats, and the like. Certain safety systems either prevent humans from working in close proximity to robots, or require line-of-sight imaging devices to detect presence of humans within the robotic work environment.

As can be appreciated, a large, industrial scale robot can pose a safety risk to humans. For example, a distracted human can enter an operative range of an end effector of a robot, and may be accidentally contacted by the end effector, which can lead to injury.

Certain tasks may require cooperative action between robots and humans to successfully complete. In factory and supply chain settings, the ability to increase production can be hampered without the ability of humans to work safely in close proximity to a robot. However, latency in data processing, and increased size and mass of a robot may increase the time it takes for one or more portions of the robot to fully stop before contacting a human.

SUMMARY OF THE DISCLOSURE

A need exists for an improved safety system and method within a robotic work environment. With that need in mind, certain examples of the present disclosure provide a system including a robot. A radar transmitter is configured to output a radar signal. A harmonic receiver is configured to receive a harmonic signal. A harmonic reflector is configured to be coupled to an object. The harmonic reflector is configured to output the harmonic signal in response to the radar signal contacting the harmonic reflector. A control unit is in communication with the robot, the radar transmitter, and the harmonic receiver. The control unit is configured to determine a position, a speed, and a direction of the harmonic reflector based on the harmonic signal, and regulate operation of the robot based on the position, the speed, and direction of the harmonic reflector.

In at least one example, the control unit is configured to regulate the operation of the robot by allowing a normal mode of operation in response to determining that the harmonic reflector is outside of an operative range of the robot, and the harmonic reflector is not moving toward the operative range. As a further example, the control unit is configured to regulate the operation of the robot by one or both of restricting operation of the robot, or stopping operation of the robot in response to determining the harmonic reflector is inside the operative range of the robot or moving toward the operative range at a predetermined speed.

In at least one example, the robot includes the radar transmitter and the harmonic receiver. In a further example, the radar transmitter and the harmonic receiver are mounted on an end effector of the robot.

In at least one example, the robot includes the control unit. In at least one example, the robot includes the radar transmitter, the harmonic receiver, and the control unit.

In at least one example, the control unit is configured to determine the position, the speed, and the direction of the harmonic reflector based on a Doppler effect of the harmonic signal.

As an example, the harmonic reflector is disposed on a portion of clothing.

Certain examples of the present disclosure provide a method including determining, by the control unit, a position, a speed, and a direction of the harmonic reflector based on the harmonic signal; and regulating, by the control unit, operation of the robot based on the position, the speed, and direction of the harmonic reflector.

Certain examples of the present disclosure provide a non-transitory computer-readable storage medium comprising executable instructions that, in response to execution, cause one or more control units comprising a processor, to perform operations including determining a position, a speed, and a direction of a harmonic reflector based on a harmonic signal output by the harmonic reflector in response to being contacted by a radar signal; and regulating operation of a robot based on the position, the speed, and direction of the harmonic reflector.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide a system configured to track and predict a vector of a moving object within a working area of a robot. The system includes one or more harmonic reflectors coupled to the moving object. A transmitter coupled to the robot outputs a radar signal, which is received by the harmonic reflector(s). In response, a harmonic signal is generated and sent back from the harmonic reflector(s). The harmonic signal is received by a harmonic receiver coupled to the robot. Based on the Doppler effect, there is a shift in the harmonic tone as the harmonic reflector(s) moves, thereby providing both direction and velocity of the harmonic reflector(s). A control unit tracks the harmonic signal reflected by the harmonic reflector(s), and predicts when the object may enter a safe operating area, thereby causing the robot to either slow down or stop. In at least one example, a faster moving object initiates a faster safety response (such as slowing down or stopping) before a slower moving object. When the object moves far enough away from the robot, the control unit allows the robot to resume its task.

Figure 1:
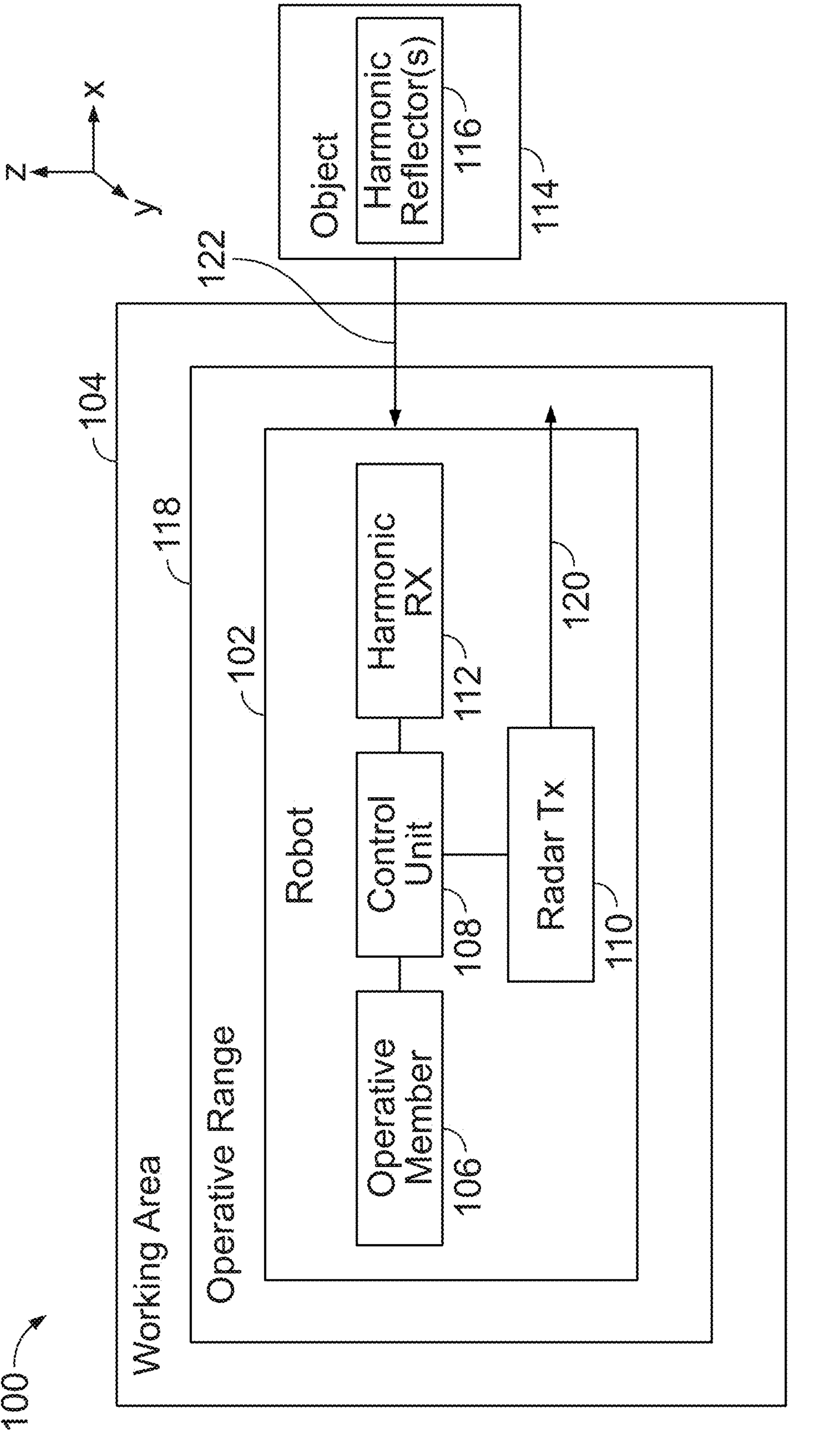
FIG. 1 illustrates a simplified block diagram of a system, according to an example of the present disclosure.

FIG. 1 illustrates a simplified block diagram of a system 100, according to an example of the present disclosure. The system 100 includes a robot 102 configured to operate within a working area 104. In at least one example, the system 100 is a cobotic system in which the robot 102 and human operators each perform certain operations on a workpiece. The workpiece can be any structure that is configured to be formed through a robotic and/or cobotic process. For example, the workpiece can be a structure of a vehicle. As a further example, the workpiece can be a portion of a fuselage, wing, or the like of an aircraft. As another example, the workpiece can be a structure that forms a portion of a fixed structure, such as a residential or commercial building.

The robot 102 includes an operative member 106. In at least one example, the operative member 106 includes an end effector connected to one or more articulating arms. The end effector and the arm(s) are operatively coupled to one or more actuators, such as electric motors. The operative member 106 is configured to operate on a structure, such as a workpiece. The operative member 106 can include a drill, a saw, a milling device, a lathe, a grappling arm. a laser, a vacuum, and/or the like.

The robot 102 further includes a control unit 108 in communication with the operative member 106, such as through one or more wired or wireless connections. The control unit 108 is also in communication with one or more radar transmitters 110 and one or more harmonic receivers 112, such as through one or more wired or wireless connections. The radar transmitter(s) 110 and the harmonic receiver(s) 112 are secured to one or more portions of the robot 102, such as one or more portions of the operative member 106, a base, an arm, an articulating joint, and/or the like. In at least one example, the radar transmitter(s) 110 and the harmonic receiver(s) 112 are separate and distinct form one another. In another example, the radar transmitter 110 and the harmonic receiver 112 can be contained within a single device, such as a transceiver.

In at least one other example, the control unit 108 is separate and distinct from the robot 102. For example, the control unit 108 can be within a computer work station configured to control operation of the robot 102.

In at least one other example, the radar transmitter 110 and the harmonic receiver 112 can be separate and distinct from the robot 102. For example, a housing including the radar transmitter 110 and the harmonic receiver 112 can be disposed within the working area 104.

As shown, the control unit 108 is in communication with the robot 102 (for example, the operative member 106), the radar transmitter(s) 110, and the harmonic receiver(s) 112. The control unit 108 is configured to regulate operation of the robot 102 (for example, the operative member 106) based on one or more signals received by the harmonic receiver(s) 112. Optionally, the operative member 106 can be operated by a separate control unit, which is in communication with the control unit 108.

An object 114 is able to move in relation to the working area 104. In at least one example, the object 114 is a human being. As another example, the object 114 is a vehicle, another robot, a work stand, a pallet, a workpiece, and/or the like. In order to track movement of the object 114 in relation to the working area 104, one or more harmonic reflector(s) 116 are coupled to the object 114. For example, the harmonic reflector(s) 116 can be coupled to an article of clothing, a helmet, or the like worn by a human. As another example, the harmonic reflector(s) 116 can be securely mounted to an outer surface of a vehicle, another, robot, a workpiece, or the like. The harmonic reflector(s) 116 move along with the object 114. Thus, a tracked position of the harmonic reflector(s) 116 also provides a tracked position of the object 114.

The harmonic reflector 116 is configured to output a harmonic signal in response to receiving a radar signal, which impinges on the harmonic reflector 116. In at least one example, the harmonic reflector 116 is or otherwise includes a harmonic transceiver, a passive transponder, and/or the like, which can include a non-linear device, such as a Schottky diode or a non-linear diode. In at least one example, the harmonic reflector 116 can be implemented in the form on an integrated chip.

The robot 102 is configured to move throughout an operative range 118 of the working area 104. The operative range 118 can include all directions in relation to an X axis, a Y axis, and a Z axis. For example, a robot 102 supported on a floor within a working area 104 can have an operative member 106 including one or more arms. In such an example, the arm(s) in a fully extended position define the operative range 118 as a hemisphere defining a particular volume of space over the floor.

The control unit 108 is configured to monitor a position, a speed, and a heading of the harmonic reflector(s) 116 coupled to the object 114, and control operation of the operative member 106 based on the position, speed, and heading of the harmonic reflector(s) 116. In operation, the radar transmitter 110 outputs a radar signal 120 that is received by the harmonic reflector 116. In response to the radar signal 120 impinging or otherwise contacting the harmonic reflector 116, the harmonic reflector 116 outputs a harmonic signal 122 derived from the radar signal 120. The harmonic receiver 112 receives the harmonic signal 122. The control unit 108, in communication with the harmonic receiver 112, receives the harmonic signal 122 and determines the position, speed, and heading of the harmonic reflector(s) 116, and therefore the object, from the harmonic signal 122.

In at least one example, the radar signal 120 has a specific frequency. The harmonic reflector 116 is tuned to respond to (for example, resonate) the specific frequency of the radar signal 120. When the radar signal 120 contacts the harmonic reflector 116, a non-linear device of the harmonic reflector 116 resonates at the specific frequency, and generates a response in the form of the harmonic signal 122. For example, the harmonic signal (including a harmonic frequency) can be a multiple of the specific frequency of the radar signal 120. In at least one example, the harmonic signal 122 is twice the frequency of the radar signal 120.

The control unit 108 determines the Doppler effect of the harmonic signal 122 to track and predict a vector of the object 114. That is, the control unit 108 tracks the Doppler effect of the harmonic signal 122 received by the harmonic receiver 112 to determine the vector (including speed and direction) of the object 114 in relation to the working area 104. The harmonic reflector 116 emits the harmonic signal 122 having a harmonic frequency in response to being activated by a radio frequency of the radar signal 120. As the harmonic reflector 116 moves, the Doppler effect occurs. From the Doppler effect included in the harmonic signal 122, the control unit 108 determines the velocity and direction of the harmonic reflector 116 (and therefore the object 114). In this manner, the control unit 108 tracks and predicts movement of the object 114.

In at least one example, the control unit 108 further predicts (based on predetermined, stored data) latency and time to stop one or more portions of the robot 102. Combined with the data within the harmonic signal 122, the control unit 108 then predicts how long it will take for the robot 102 to contact the object 114 (based on current trajectory and speed), thereby ensuring that the robot slows, stops, or shuts down prior to contact with the object 114. As such, the control unit 108 is configured to detect and process the Doppler effect of the harmonic signal 122 received from the harmonic reflector 116 to predict if and when contact between the object 114 with the robot 102 will occur, and then restrict operation (such as by slowing motion of the robot 102, preventing operation within a certain portion of the operative range of the robot 102, or deactivating the robot 102) to prevent such contact.

The control unit 108 is configured to control operation of the robot 102 based on the harmonic signal 122 received form the harmonic reflector(s) 116 coupled to the object 114. For example, in response to the harmonic signal 122 indicating that the object 114 is stationary (that is, not moving) and outside of the operative range 118 of the robot 102, the control unit 108 allows the robot 102 to operate in a normal, unrestricted manner (such as according to a control plan in relation to a workpiece, for example). Conversely, in response to the harmonic signal 122 indicating that the object 114 is within the operative range 118, the control unit 108 may deactivate the robot 102, or allow the robot 102 to operate in a restricted manner. For example, the control unit 108 may prevent operation of the operative member 106. As another example, the control unit 108 may restrict movement of the operative member to a reduced range within the operative range 118. The reduced range is a range in which the object 114 is not located, nor moving toward.

As described herein, the system 100 includes the robot 102, the radar transmitter 110 configured to output the radar signal 120, and the harmonic receiver 112 configured to receive the harmonic signal 122. The harmonic reflector 116 is configured to be coupled to the object 114 (and therefore be associated with a location, a speed, and direction of the object 114). The harmonic reflector 116 is configured to output the harmonic signal 122 in response to the radar signal 120 contacting the harmonic reflector 116. The control unit 108 is in communication with the robot 102, the radar transmitter 110, and the harmonic receiver 112. The control unit 108 is configured to determine a position, a speed, and a direction of the harmonic reflector 116 (and therefore the object 114) based on the harmonic signal 122, and regulate operation of the robot 102 based on the position, the speed, and direction of the harmonic reflector 116. For example, the control unit 108 is configured to regulate the operation of the robot 102 by allowing a normal mode of operation in response to determining that the harmonic reflector 116 is outside of the operative range 118 of the robot 102, and the harmonic reflector 116 is not moving toward the operative range 118. As a further example, the control unit 108 is configured to regulate the operation of the robot 102 by restricting operation of the robot 102 (such as by causing the robot 102 to operate in a restricted mode of operation) and/or stopping operation of the robot 102 in response to determining the harmonic reflector 116 is inside the operative range 118 of the robot 102 or moving toward the operative range 118 at a predetermined speed, which exceeds a threshold at which the robot 102 can cease operating before the object 114 contacts one or more portions of the robot 102 (the magnitude of which is stored in memory).

Figure 2:
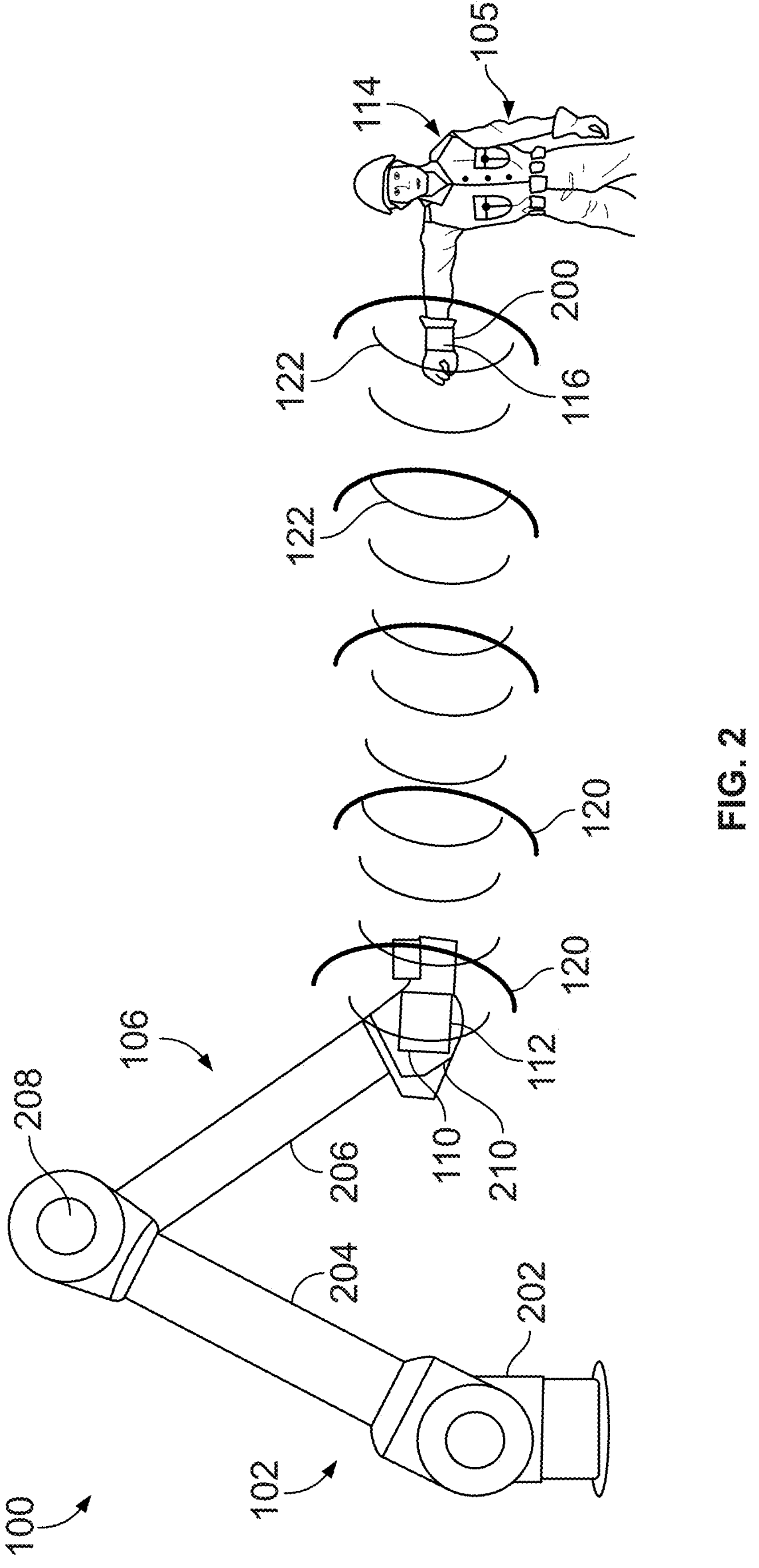
FIG. 2 illustrates a lateral view of a robot in relation to a human, according to an example of the present disclosure.

FIG. 2 illustrates a lateral view of the robot 102 in relation to a human 105, according to an example of the present disclosure. Referring to FIGS. 1 and 2, the human 105 is an object 114 that can move in relation to the operative range 118 of the robot 102. The human 105 wears the harmonic reflector 116 on a portion of clothing, such as an arm band 200. Optionally, the harmonic reflector 116 can be worn on a shirt, a helmet, a headband, a belt, or the like. As another example, the human 105 can wear multiple harmonic reflectors 116.

The robot 102 includes a base 202, and arms 204 and 206 coupled together at one or more articulating joints 208. An end effector 210 is mounted to an end of the arm 206. The radar transmitter 110 and the harmonic receiver 112 are mounted on the end effector 210. Optionally, the radar transmitter 110 and the harmonic receiver 112 can be mounted on other portions of the robot 102, such as the arms 204 or 206, the articulating joint 208, or the base 202. As another example, the robot 102 can include multiple radar transmitters 110 and harmonic receivers 112. As noted, the radar transmitter 110 outputs the radar signal 120, which contacts the harmonic reflector 116. In response, the harmonic reflector 116 outputs the harmonic signal 122, which includes a Doppler effect. The harmonic receiver 112 receives the harmonic signal 122, and the control unit 108 determines the Doppler effect from the harmonic signal 122. Based on the determined Doppler effect of the harmonic signal 122, the control unit 108 determines the position, speed, and heading of the harmonic reflector 116, and therefore the object 114.

In response to determining from the harmonic signal 122 that the harmonic reflector 116 (and therefore the human 105) is stationary (that is, not moving), and outside of the operative range 118 of the robot 102, the control unit 108 allows operation of the robot 102 in a normal mode of operation (for example, in an unrestricted manner). The operative range 118 is stored in a memory of, or in communication with, the control unit 108.

Figure 3:
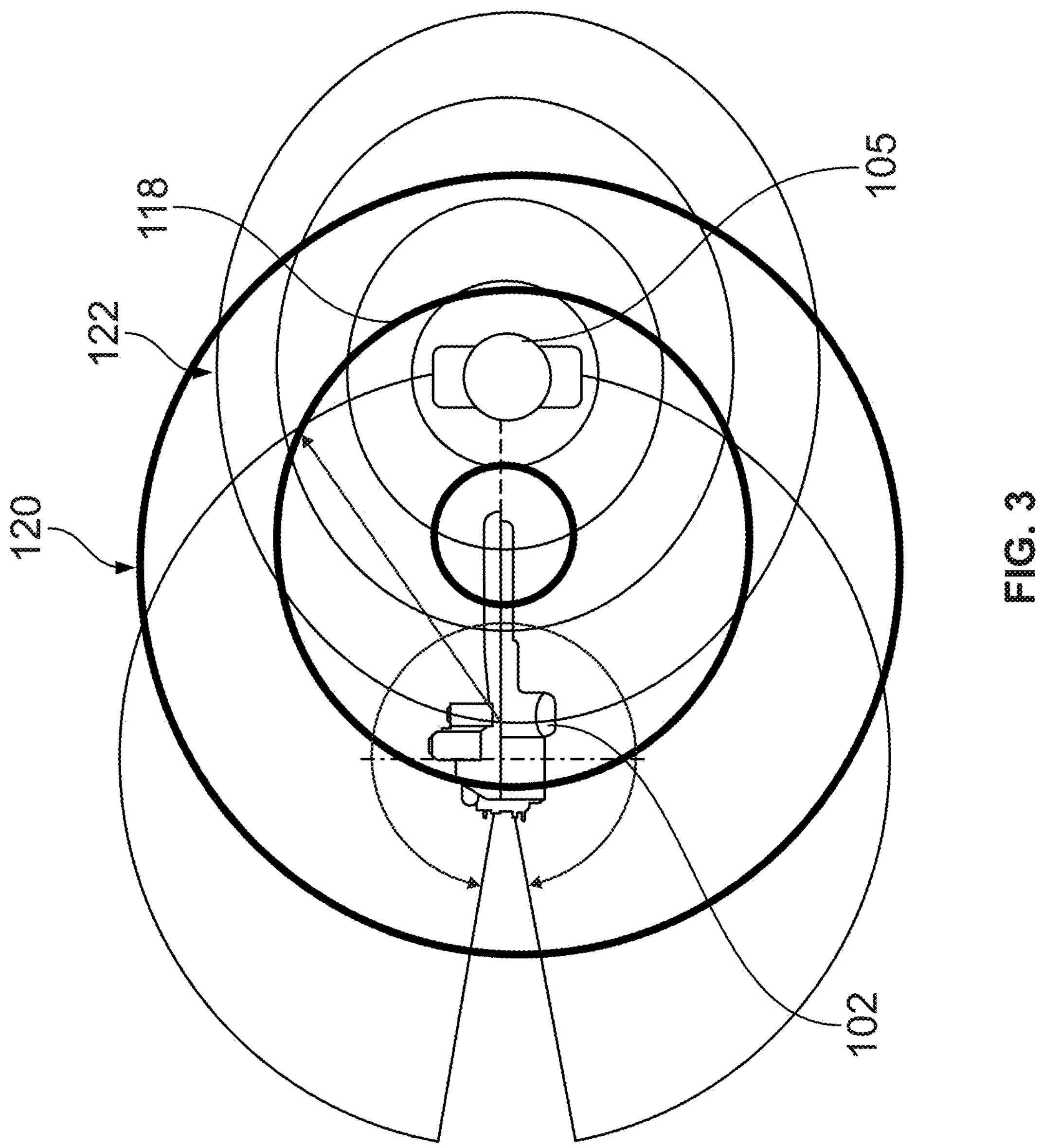
FIG. 3 illustrates a top view of the robot in relation to the human, according to an example of the present disclosure.

FIG. 3 illustrates a top view of the robot 102 in relation to the human 105, according to an example of the present disclosure. Referring to FIGS. 1-3, in response to determining from the harmonic signal 122 that the harmonic reflector 116 (and therefore the human 105) is stationary, but within the operative range of the robot 102, the control unit 108 either restricts operation of the robot 102 in a restricted mode of operation, or stops operation of the robot 102. In the restricted mode of operation, the robot 102 can operate at a slower speed, and/or within a reduced area of the operative range 118 that does not include the human 105.

When the human 105 moves away from the robot 102, such as away from the operative range, the harmonic signal 122 received from the harmonic reflector 116 shifts to a lower harmonic frequency, which the control unit 108 determines as the harmonic reflector 116 moving away from the robot 102. In this manner, the control unit 108 can transition the robot 102 back to the normal mode of operation as the harmonic reflector 116 moves outside of the operative range, and/or adapt the restricted mode of operation (such as to increase area in which the robot 102 can operate, increase operational speed of the robot 102, and/or the like) as the human 105 moves away from the robot 102.

In contrast, as the harmonic reflector 116 moves toward the robot 102, the harmonic signal 122 received form the harmonic reflector 116 shifts to a higher harmonic frequency, which the control unit 108 determines as the harmonic reflector moving toward the robot 102. As such, the control unit 108 can restrict operation of the robot 102 as the harmonic reflector 116 (and therefore the human 105) moves toward and into the operative range 118.

As described herein, the control unit 108 determines a vector (speed and direction) of the harmonic reflector 116 (and therefore the object 114) from the harmonic signal 122. Based on the harmonic signal 122 (such as the Doppler effect therein), the control unit 108 determines the location of the object 114, as well as a current trajectory to determine whether or not to restrict or stop operation of the robot 102.

Figure 4:
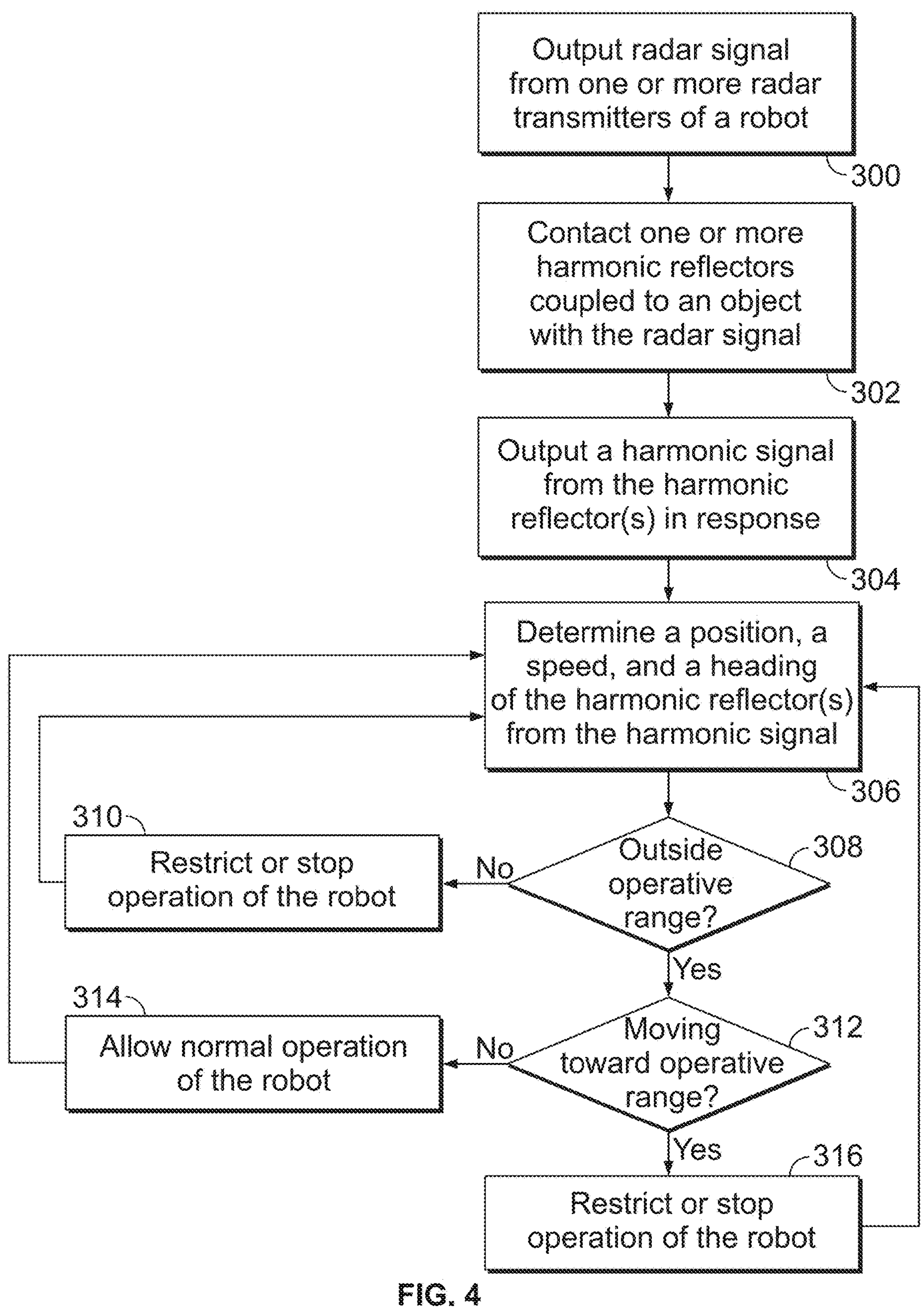
FIG. 4 illustrates a flow chart of a method, according to an example of the present disclosure.

FIG. 4 illustrates a flow chart of a method, according to an example of the present disclosure. Referring to FIGS. 1-4, at 300, the radar transmitter(s) 110 outputs the radar signal 120. At 302, the radar signal 120 contacts one or more harmonic reflectors 116 coupled to the object 114 (such as the human 105). At 304, in response to being contacted by the radar signal 120, the harmonic reflector(s) 116 output the harmonic signal 122. At 306, the control unit 108 receives the harmonic signal 122 via the harmonic receiver 112, and determines a position, a speed, and a heading of the harmonic reflector(s) 116 (and therefore the object 114) from the harmonic signal 122 (such as through the Doppler effect—for example, a Doppler shift—within the harmonic signal 122).

At 308, based on the harmonic signal 122 and the predetermined location of the operative range 118 (such as stored in memory), the control unit 108 determines if the harmonic reflector(s) 116 is outside of the operative range 118 of the robot 102. If not, the method proceeds to 310, at which the control unit 108 restricts or stops operation of the robot 102. For example, if the robot 102 was operating in a normal mode of operation, the control unit 108 transitions the robot 102 into a restricted mode of operation, such as by slowing an operational rate, limiting movement within the operative range to avoid the object 114), and/or the like. As another example, the control unit 108 can stop operation of the robot 102. The method then proceeds from 310 back to 306.

If, however, the harmonic reflector(s) 116 is outside of the operative range 118 at 308, the method proceeds to 312, at which the control unit 108 determines if the harmonic reflector(s) 116 is moving toward the operative range 118. If not, the method proceeds to 314, at which the control unit 108 allows normal operation of the robot 102. The method then returns to 306.

If, however, the control unit 108 determines that the harmonic reflector(s) 116 is moving toward the operative range 118 of the robot 102 at 312, the method proceeds to 316, which the control unit 108 restricts of stops operation of the robot 102. The method then returns to 306.

As described herein, the systems and methods determine location and track movement of the harmonic reflector(s) 116 (and therefore the object) in relation to the working area 104. Based on the Doppler effect, there is a shift in harmonic tone of the harmonic signal 122 as the harmonic reflector(s) 116 moves, thereby providing both direction and velocity to the control unit 108. By tracking the harmonic signal 122, the control unit 108 is able to predict when the object 114 may enter the operative range 118 of the robot 102, and can then restrict or stop operation of the robot 102.

Examples of the present disclosure can be used in non line-of-sight environments. In particular, in at least one example, the radar transmitter(s) 110 and the harmonic reflector(s) 116 do not need to be (although may be) in a line-of-sight of each other. Similarly, the harmonic reflector(s) 116 and the harmonic receiver(s) 112 do not need to be (although may be) in a line-of-sight of each other. Instead, intervening structures (such as walls, a floor, a ceiling, a vehicle, a work stand, or the like) can be between the radar transmitter(s) 110 and the harmonic reflector(s) 116, and between the harmonic reflector(s) 116 and the harmonic receiver(s) 112.

Figure 5:
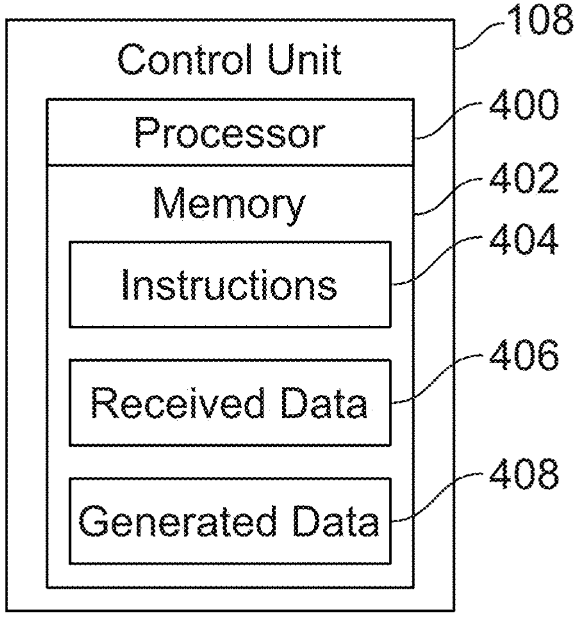
FIG. 5 illustrates a schematic block diagram of a control unit, according to an example of the present disclosure.

FIG. 5 illustrates a schematic block diagram of the control unit 108, according to an example of the present disclosure. In at least one example, the control unit 108 includes at least one processor 400 in communication with a memory 402. The memory 402 stores instructions 404, received data 406, and generated data 408. The control unit 108 shown in FIG. 5 is merely exemplary, and non-limiting.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 108 may be or include one or more processors that are configured to control operation, as described herein.

The control unit 108 is configured to execute a set of instructions that are stored in one or more data storage units or elements (such as one or more memories), in order to process data. For example, the control unit 108 may include or be coupled to one or more memories. The data storage units may also store data or other information as desired or needed. The data storage units may be in the form of an information source or a physical memory element within a processing machine.

The set of instructions may include various commands that instruct the control unit 108 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 108. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 108 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Further, the disclosure comprises examples according to the following clauses:

Clause 1. A system comprising:

a robot;

a radar transmitter configured to output a radar signal;

a harmonic receiver configured to receive a harmonic signal;

a harmonic reflector configured to be coupled to an object, wherein the harmonic reflector is configured to output the harmonic signal in response to the radar signal contacting the harmonic reflector; and a control unit in communication with the robot, the radar transmitter, and the harmonic receiver, wherein the control unit is configured to:

determine a position, a speed, and a direction of the harmonic reflector based on the harmonic signal, and regulate operation of the robot based on the position, the speed, and direction of the harmonic reflector.

Clause 2. The system of Clause 1, wherein the control unit is configured to regulate the operation of the robot by allowing a normal mode of operation in response to determining that the harmonic reflector is outside of an operative range of the robot, and the harmonic reflector is not moving toward the operative range.

Clause 3. The system of Clause 2, wherein the control unit is configured to regulate the operation of the robot by one or both of restricting operation of the robot, or stopping operation of the robot in response to determining the harmonic reflector is inside the operative range of the robot or moving toward the operative range at a predetermined speed.

Clause 4. The system of any of Clauses 1-3, wherein the robot comprises the radar transmitter and the harmonic receiver.

Clause 5. The system of Clause 4, wherein the radar transmitter and the harmonic receiver are mounted on an end effector of the robot.

Clause 6. The system of any of Clauses 1-5, wherein the robot comprises the control unit.

Clause 7. The system of any of Clauses 1-6, wherein the robot comprises the radar transmitter, the harmonic receiver, and the control unit.

Clause 8. The system of any of Clauses 1-7, wherein the control unit is configured to determine the position, the speed, and the direction of the harmonic reflector based on a Doppler effect of the harmonic signal.

Clause 9. The system of any of Clauses 1-8, wherein the harmonic reflector is disposed on a portion of clothing.

Clause 10. A method for a system comprising:

a robot;

a radar transmitter configured to output a radar signal;

a harmonic receiver configured to receive a harmonic signal;

a harmonic reflector configured to be coupled to an object, wherein the harmonic reflector is configured to output the harmonic signal in response to the radar signal contacting the harmonic reflector; and a control unit in communication with the robot, the radar transmitter, and the harmonic receiver, wherein the method comprises:

determining, by the control unit, a position, a speed, and a direction of the harmonic reflector based on the harmonic signal; and regulating, by the control unit, operation of the robot based on the position, the speed, and direction of the harmonic reflector.

Clause 11. The method of Clause 10, wherein said regulating comprises allowing a normal mode of operation in response to determining that the harmonic reflector is outside of an operative range of the robot, and the harmonic reflector is not moving toward the operative range.

Clause 12. The method of Clause 11, wherein said regulating further comprises one or both of restricting operation of the robot, or stopping operation of the robot in response to determining the harmonic reflector is inside an operative range of the robot or moving toward the operative range at a predetermined speed.

Clause 13. The method of any of Clauses 10-12, wherein the robot comprises the radar transmitter and the harmonic receiver.

Clause 14. The method of Clause 13, wherein the radar transmitter and the harmonic receiver are mounted on an end effector of the robot.

Clause 15. The method of any of Clauses 10-14, wherein the robot comprises the control unit.

Clause 16. The method of any of Clauses 10-15, wherein said determining is based on a Doppler effect of the harmonic signal.

Clause 17. The method of any of Clauses 10-16, wherein the harmonic reflector is disposed on a portion of clothing.

Clause 18. A non-transitory computer-readable storage medium comprising executable instructions that, in response to execution, cause one or more control units comprising a processor, to perform operations comprising:

determining a position, a speed, and a direction of a harmonic reflector based on a harmonic signal output by the harmonic reflector in response to being contacted by a radar signal; and regulating operation of a robot based on the position, the speed, and direction of the harmonic reflector.

Clause 19. The non-transitory computer-readable storage medium of Clause 18, wherein said regulating comprises allowing a normal mode of operation in response to determining that the harmonic reflector is outside of an operative range of the robot, and the harmonic reflector is not moving toward the operative range.

Clause 20. The non-transitory computer-readable storage medium of Clause 19, wherein said regulating further comprises one or both of restricting operation of the robot, or stopping operation of the robot in response to determining the harmonic reflector is inside the operative range of the robot or moving toward the operative range at a predetermined speed.

As described herein, examples of the present disclosure provide improved safety systems and methods within a robotic work environment.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:

a robot;

a radar transmitter configured to output a radar signal;

a harmonic receiver configured to receive a harmonic signal including a Doppler effect;

a harmonic reflector configured to be coupled to an object, wherein the harmonic reflector is configured to reflect the harmonic signal including the Doppler effect in response to the radar signal contacting the harmonic reflector; and a control unit in communication with the robot, the radar transmitter, and the harmonic receiver, wherein the control unit is configured to:

track the Doppler effect of the harmonic signal reflected by the harmonic reflector, determine from the Doppler effect of the harmonic signal a position, a speed, and a heading of the harmonic reflector, and regulate operation of the robot based on the position, the speed, and the heading of the harmonic reflector by (a) determining, based on the position, the speed, and the heading of the harmonic reflector, that the object is stationary and outside of an operative range of the robot, and providing normal, unrestricted operation of the robot only in response to determining that the object is stationary and outside of the operative range of the robot, (b) determining, based on the position, the speed, and the heading of the harmonic reflector, that the object is within the operative range of the robot and moving toward the robot, and deactivating the robot only in response to determining that the object is within the operative range of the robot and moving toward the robot, wherein the deactivating prevents any operation of the robot, (c) determining, based on the position, the speed, and the heading of the harmonic reflector, that the object is within the operative range of the robot and not moving toward the robot or moving away from the robot, and restricting movement of one or more portions of the robot to a reduced range within the operative range only in response to determining that the object is within the operative range of the robot and not moving toward the robot or moving away from the robot, wherein the restricting allows for operation beyond said deactivating, but less than normal, unrestricted operation of the robot, and (d) determining, based on the position, the speed, and the heading of the harmonic reflector, that the object has moved from a location within the operative range to a location outside of the operative range, and transitioning the robot back to the normal, unrestricted operation only in response to determining that the object has moved from the location within the operative range to the location outside of the operative range.

2. The system of claim 1, wherein the robot comprises the radar transmitter and the harmonic receiver.

3. The system of claim 2, wherein the radar transmitter and the harmonic receiver are mounted on an end effector of the robot.

4. The system of claim 1, wherein the robot comprises the control unit.

5. The system of claim 1, wherein the robot comprises the radar transmitter, the harmonic receiver, and the control unit.

6. The system of claim 1, wherein the harmonic reflector is disposed on a portion of clothing.

7. The system of claim 1, wherein the radar signal has a specific frequency, wherein the harmonic reflector is configured resonate at the specific frequency of the radar signal and generate the harmonic signal, and wherein the harmonic signal is at least twice the frequency of the radar signal.

8. The system of claim 1, wherein the control unit is further configured to predict time to stop one or more portions of the robot in relation to a trajectory and speed of the object.

9. The system of claim 1, wherein the control unit is further configured to increase both an area of the reduced range within the operative range, and an operational speed of the robot in response to determining that the object is within the operative range and moving away from the robot.

10. A method for a system comprising:

a robot;

a radar transmitter configured to output a radar signal;

a harmonic receiver configured to receive a harmonic signal including a Doppler effect;

a harmonic reflector configured to be coupled to an object, wherein the harmonic reflector is configured to reflect the harmonic signal including the Doppler effect in response to the radar signal contacting the harmonic reflector; and a control unit in communication with the robot, the radar transmitter, and the harmonic receiver, wherein the method comprises:

tracking, by the control unit, the Doppler effect of the harmonic signal reflected by the harmonic reflector;

determining, from the Doppler effect of the harmonic signal by the control unit, a position, a speed, and a heading of the harmonic reflector; and regulating, by the control unit, operation of the robot based on the position, the speed, and the heading of the harmonic reflector, wherein said regulating comprises:

determining, based on the position, the speed, and the heading of the harmonic reflector, that the object is stationary and outside of an operative range of the robot;

providing normal, unrestricted operation of the robot only in response to determining that the object is stationary and outside of the operative range of the robot;

determining, based on the position, the speed, and the heading of the harmonic reflector, that the object is within the operative range of the robot and moving toward the robot;

deactivating the robot only in response to determining that the object is within the operative range of the robot and moving toward the robot, wherein said deactivating prevents any operation of the robot;

determining, based on the position, the speed, and the heading of the harmonic reflector, that the object is within the operative range of the robot and not moving toward the robot or moving away from the robot;

restricting movement of one or more portions of the robot to a reduced range within the operative range only in response to determining that the object is within the operative range of the robot and not moving toward the robot or moving away from the robot, wherein said restricting allows for operation beyond said deactivating, but less than normal, unrestricted operation of the robot; and determining, based on the position, the speed, and the heading of the harmonic reflector, that the object has moved from a location within the operative range to a location outside of the operative range; and transitioning the robot back to the normal, unrestricted operation in response to determining that the object has moved from the location within the operative range to the location outside of the operative range.

11. The method of claim 10, wherein the robot comprises the radar transmitter and the harmonic receiver.

12. The method of claim 11, wherein the radar transmitter and the harmonic receiver are mounted on an end effector of the robot.

13. The method of claim 10, wherein the robot comprises the control unit.

14. The method of claim 10, wherein the harmonic reflector is disposed on a portion of clothing.

15. The method of claim 10, wherein the radar signal has a specific frequency, wherein the harmonic reflector resonates at the specific frequency of the radar signal and generates the harmonic signal, and wherein the harmonic signal is at least twice the frequency of the radar signal.

16. The method of claim 10, further comprising predicting, by the control unit, time to stop one or more portions of the robot in relation to a trajectory and speed of the object.

17. The method of claim 10, wherein said regulating further comprises increasing, by the control unit, both an area of the reduced range within the operative range, and an operational speed of the robot in response to determining that the object is within the operative range and moving away from the robot.

18. A non-transitory computer-readable storage medium comprising executable instructions that, in response to execution, cause one or more control units comprising a processor, to perform operations comprising:

tracking a Doppler effect of a harmonic signal reflected by a harmonic reflector in response to being contacted by a radar signal;

determining from the Doppler effect of the harmonic signal a position, a speed, and a heading of the harmonic reflector; and regulating operation of a robot based on the position, the speed, and the heading of the harmonic reflector, wherein said regulating comprises:

determining, based on the position, the speed, and the heading of the harmonic reflector, that the object is stationary and outside of an operative range of the robot;

providing normal, unrestricted operation of the robot only in response to determining that the object is stationary and outside of the operative range of the robot;

determining, based on the position, the speed, and the heading of the harmonic reflector, that the object is within the operative range of the robot and moving toward the robot;

deactivating the robot only in response to determining that the object is within the operative range of the robot and moving toward the robot;

determining, based on the position, the speed, and the heading of the harmonic reflector, that the object is within the operative range of the robot and not moving toward the robot or moving away from the robot;

restricting movement of one or more portions of the robot to a reduced range within the operative range in response to determining that the object is within the operative range of the robot and not moving toward the robot or moving away from the robot wherein said restricting allows for operation beyond said deactivating, but less than normal, unrestricted operation of the robot;

determining, based on the position, the speed, and the heading of the harmonic reflector, that the object has moved from a location within the operative range to a location outside of the operative range; and transitioning the robot back to the normal, unrestricted operation in response to determining that the object has moved from the location within the operative range to the location outside of the operative range.

19. The non-transitory computer-readable storage medium of claim 18, wherein the radar signal has a specific frequency, wherein the harmonic reflector is configured resonate at the specific frequency of the radar signal and generate the harmonic signal, and wherein the harmonic signal is at least twice the frequency of the radar signal.

20. The non-transitory computer-readable storage medium of claim 18, further comprising predicting, by the control unit, time to stop one or more portions of the robot in relation to a trajectory and speed of the object.

* * * * *